(12) United States Patent
Giebas et al.

(10) Patent No.: US 10,041,592 B2
(45) Date of Patent: Aug. 7, 2018

(54) INTERLOCKING PISTON BUTTON

(71) Applicant: Western Distributing Company, Denver, CO (US)

(72) Inventors: Robert John Giebas, Lakewood, CO (US); Nicholas Plantus, Englewood, CO (US)

(73) Assignee: WESTERN DISTRIBUTING COMPANY, Denver, CO (US)

( * ) Notice: Subject to any disclaimer, the term of this patent is extended or adjusted under 35 U.S.C. 154(b) by 0 days.

(21) Appl. No.: 15/254,790

(22) Filed: Sep. 1, 2016

(65) Prior Publication Data
US 2018/0058580 A1  Mar. 1, 2018

(51) Int. Cl.
*F16J 1/18* (2006.01)
*F02F 3/00* (2006.01)

(52) U.S. Cl.
CPC .. *F16J 1/18* (2013.01); *F02F 3/00* (2013.01)

(58) Field of Classification Search
CPC .......... F02F 3/00; F02F 3/0069; F02F 3/0015; F02F 3/28; F16J 1/16; F16J 1/18
See application file for complete search history.

(56) References Cited

U.S. PATENT DOCUMENTS

| 3,442,184 | A | * | 5/1969 | Pritchard | F16J 1/14 92/187 |
|---|---|---|---|---|---|
| 4,508,019 | A | * | 4/1985 | Kabele | F16J 1/18 92/158 |
| 5,072,654 | A | * | 12/1991 | MacGregor | F02F 3/0069 123/197.3 |
| 5,289,758 | A | * | 3/1994 | Berlinger | F16J 1/18 123/193.6 |
| 5,367,945 | A | * | 11/1994 | Halka | F16J 1/18 403/294 |
| 5,839,351 | A | * | 11/1998 | Nakada | F02F 3/00 92/160 |
| 6,048,126 | A | * | 4/2000 | Kemnitz | F16J 1/18 403/153 |
| 6,364,565 | B1 | * | 4/2002 | Billimack | F16J 1/18 403/150 |
| 6,507,985 | B1 | * | 1/2003 | Loughlin | B23P 19/084 29/215 |
| 6,550,138 | B2 | * | 4/2003 | Billimack | F16J 1/18 29/888.043 |
| 8,397,364 | B2 | * | 3/2013 | Webb | E21B 17/046 285/331 |
| 2014/0260961 | A1 | * | 9/2014 | Rediker, Jr. | F02F 3/00 92/208 |
| 2015/0219374 | A1 | * | 8/2015 | Mowers | F04B 27/0409 62/502 |

* cited by examiner

*Primary Examiner* — Long T Tran
(74) *Attorney, Agent, or Firm* — Holzer Patel Drennan

(57) ABSTRACT

An engine piston assembly includes a piston with two opposing boss bores, a first interlocking piston button with at least one interlocking protrusion compatible with at least one interlocking recess in the first boss bore, and a second interlocking piston button with at least one interlocking protrusion compatible with at least one interlocking recess in the second boss bore. The interlocking protrusions serve to prevent the buttons from rotating inside the boss bores and deforming an oil control ring inside an oil control ring groove of the piston assembly.

19 Claims, 4 Drawing Sheets

INTERLOCKING PISTON BUTTON

BACKGROUND

Many types of engines use one or more reciprocating pistons to generate power. For example, an internal combustion engine utilizes combustion of a fuel within combustion chambers to provide motive force to corresponding pistons within the engine. Each piston includes rings that provide a fluid tight seal against a cylinder wall while the piston moves up and down within the cylinder. The fluid tight seal separates the combustion chamber from a crankcase of the engine. Each piston is connected to a connecting rod using a wrist pin. The connecting rods are connected to a crankshaft of the engine. Combustion of the fuel within the combustion chambers creates rapid gas expansion, which moves the pistons linearly within the cylinders. The connecting rods transfer the linear motion of the pistons into rotational crankshaft motion, thus generating power at the crankshaft of the engine.

Several different options are available to retain a wrist pin in its place inside a piston. Clips can be used to clip the wrist pin in place, however, such clips are often difficult to change out quickly and can, in some cases, become dislodged during operation. For engines that are frequently rebuilt, such as racing engines, the wrist pins need to be able to be replaced quickly. For those situations, buttons may be more useful. Buttons slide in and out of corresponding piston bosses easily, so they are easy to change quickly. However, in some racing applications, pistons experience sufficient forces to cause circular buttons to rotate within their corresponding piston bosses. This rotation can impinge on, and perhaps deform, an oil control ring inside an oil control ring groove of the piston, causing engine problems. The engine may then be at a higher risk of failure due to damage to the oil control ring and/or oil control ring groove. As a result, the engine may need to be disassembled more frequently in order repair any damage caused by a damaged or deformed oil control ring and/or oil control ring groove.

SUMMARY

The presently disclosed technology includes an engine piston assembly comprising a piston including a first boss bore and a second boss bore, the first boss bore including a first interlocking recess and the second boss bore including a second interlocking recess, wherein the second boss bore opposes the first boss bore; a first piston button including a first interlocking protrusion that fits within the first interlocking recess of the first boss bore; and a second piston button including a second interlocking protrusion that fits within the second interlocking recess of the second boss bore.

The presently disclosed technology further includes a piston comprising a first boss with a bore including two diametrically opposed interlocking recesses; and a second boss with a bore including two additional diametrically opposed interlocking recesses, wherein the second boss bore is axially aligned with the first boss bore.

The presently disclosed technology still further includes a method of assembling an engine piston comprising fitting a first piston button including a first interlocking protrusion into a first boss bore including a first interlocking recess; inserting a wrist pin through a second boss bore and into a seat of the first piston button within the first boss bore; and fitting a second piston button including a second interlocking protrusion into the second boss bore including a second interlocking recess, while inserting the wrist pin into a seat of the second piston button.

This Summary is provided to introduce a selection of concepts in a simplified form that are further described below in the Detailed Description. Other implementations are also described and recited herein. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

DETAILED DESCRIPTION

Figure 1:
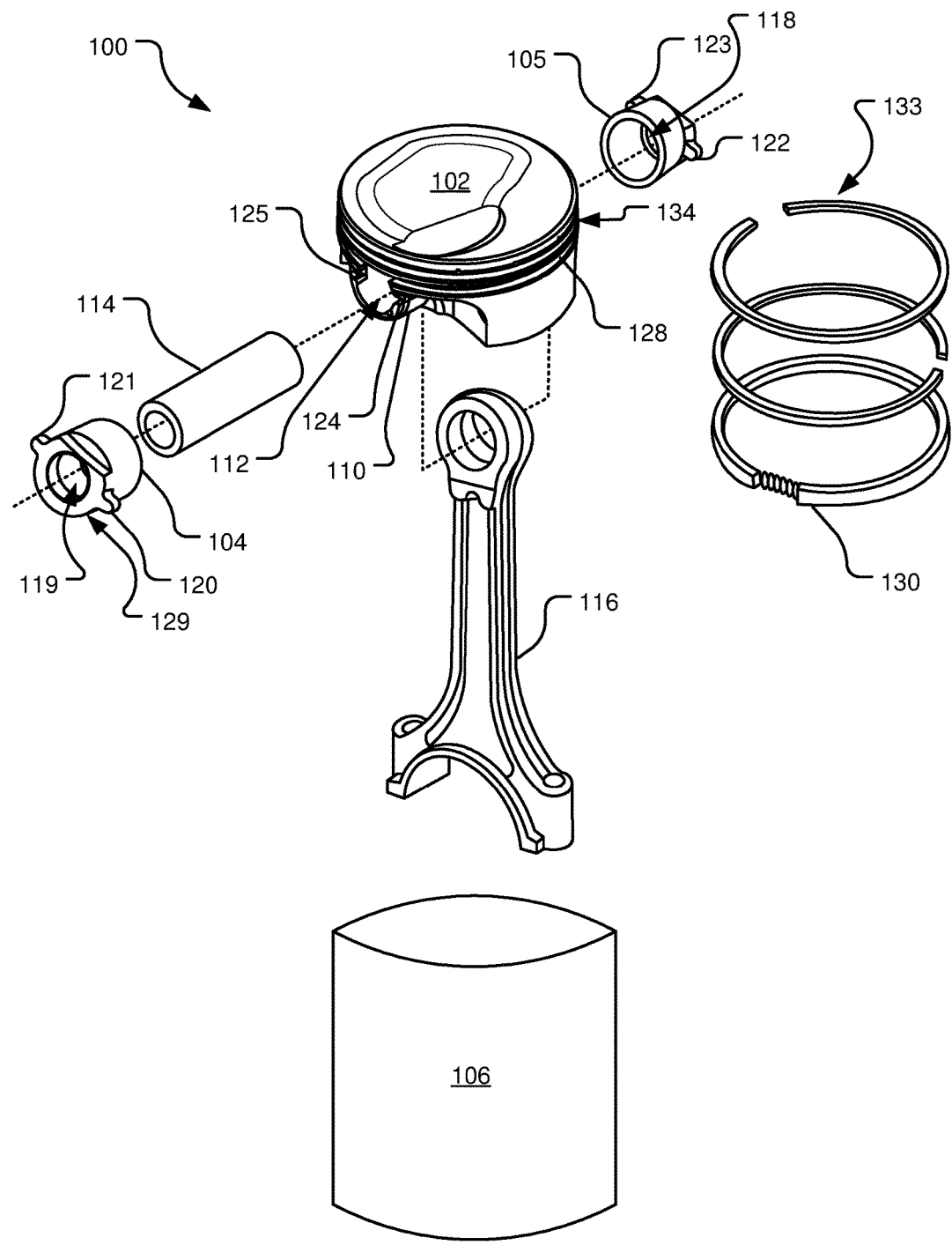
FIG. 1 is a perspective view of an exploded engine piston assembly including interlocking piston buttons.

FIG. 1 is a perspective view of an exploded engine piston assembly 100 including interlocking piston buttons 104, 105. The engine piston assembly 100 includes a piston 102, which reciprocates within a cylinder 106. The piston 102 includes two opposing bosses (e.g., boss 110), each boss including a boss bore (e.g., boss bore 112). Interlocking piston button 104 fits within boss bore 112 and interlocking piston button 105 fits within the opposing boss bore (not shown) to retain a wrist pin 114 between the interlocking piston buttons 104, 105. The wrist pin 114 is rotationally connected to a connecting rod 116. The piston 102 reciprocates linearly within the cylinder 106, generating force by compressing fluid in the cylinder 106, igniting the fluid, and capturing power from the rapidly expanding combusting fluid. The connecting rod 116 transmits linear force from the piston 102 to rotational force at a crankshaft (not shown), giving the engine power.

The interlocking piston buttons 104, 105 fit into the piston 102 to keep the wrist pin 114 in place. To keep the wrist pin 114 from sliding out of the interlocking piston buttons 104, 105, the interlocking piston buttons 104, 105 each have a first inner diameter 118 and a second inner diameter 119. In one implementation, the first inner diameter 118 of the interlocking piston buttons 104, 105 is slightly larger than the diameter of the wrist pin 114. The diameter is measured so that the wrist pin 114 will fit inside of the interlocking piston buttons 104, 105 with enough space to allow the wrist pin 114 to rotate within the interlocking piston buttons 104, 105 (also referred to herein as a slip-fit wrist pin). In another implementation, the first inner diameter 118 of the interlocking piston buttons 104, 105 is substantially the same as the diameter of the wrist pin 114 so that a press-fit wrist pin 114 will not rotate inside the interlocking piston buttons 104, 105.

The second inner diameter 119 of the interlocking piston buttons 104, 105 is substantially smaller than the diameter of the wrist pin 114. As a result, the wrist pin 114 is secured between the piston buttons 104, 105 when assembled within the piston 102. The first inner diameter opens toward the center of the piston 102, while the second inner diameter 119 passes through the entirety of each of the interlocking piston buttons 104, 105. In other implementations, the first inner diameter and the second inner diameter may vary between the interlocking piston buttons 104, 105. In still other implementations, the second inner diameter 119 is omitted in one or both of the interlocking piston buttons 104, 105, thus creating a solid piston button surface facing the cylinder 106 wall when assembled.

The interlocking piston buttons 104, 105 also each have an outer diameter 129 that is slightly smaller than the boss bore diameters. This allows the interlocking piston buttons 104, 105 to be slip-fit into their respective boss bores. In other implementations, the outer diameters 129 are substantially the same as the boss bore diameters, thus permitting a press-fit connection between the interlocking piston buttons 104, 105 and their respective boss bores. The terminology "slightly smaller diameter" and "slightly larger diameter" as used herein refers to a slip-fit connection with a standard tolerance for that sort of connection. The terminology "substantially the same diameter" as used herein refers to a light interference fit, interference fit, or press-fit connection with a standard allowance for those sorts of connections.

To prevent the interlocking piston buttons 104, 105 from rotating inside their respective boss bores, the interlocking piston buttons 104, 105 each include interlocking protrusions 120, 121, 122, 123 that fits into corresponding interlocking recesses (e.g., recesses 124, 125 in the boss bore 112). More specifically, interlocking protrusions 120, 121 of piston button 104 fit into interlocking recesses 124, 125 of boss bore 112, respectively. Similarly, interlocking protrusions 122, 123 of piston button 105 fit into interlocking recesses (not shown) of the opposing boss bore 113. The interlocking boss bores and the corresponding piston buttons 104, 105 may have a variety of different sizes and shapes and may be in a variety of configurations, as discussed more with reference to FIGS. 2 and 3, respectively. Further, while two interlocking protrusions are shown on each of interlocking piston buttons 104, 105, in other implementations, any number of interlocking protrusions may be used on each interlocking piston button.

To assemble the engine piston assembly 100, interlocking piston button 104 is inserted into boss bore 112. The interlocking protrusions 120, 121 on the interlocking piston button 104 fit into the interlocking recesses 124, 125, respectively, located on the boss bore 112. In another implementation, where the interlocking piston button 104 has only one interlocking protrusion 120, only the interlocking protrusion 120 fits into the interlocking recess 124. The wrist pin 114 is then inserted through the opposing boss bore and into the interlocking piston button 104. The wrist pin 114 goes into the interlocking piston button 104 until it is stopped by the second inner diameter 119 of the interlocking piston button 104. Lastly, the interlocking piston button 105 is inserted into the opposing boss bore, also inserting the wrist pin 114 into the interlocking piston button 105. The interlocking protrusions 122, 123 of the second interlocking piston button 105 fit into the corresponding interlocking recesses of the second boss bore. In another implementation, where the interlocking piston button 105 has only one interlocking protrusion 122, only the interlocking protrusion 122 fits into an interlocking recess of the second boss bore. Disassembly of the engine piston assembly 100 may be the opposite of that described above.

The piston 102 further includes an oil control ring groove 128. The oil control ring groove 128 receives an oil control ring 130. The oil control ring 130 scrapes oil from interior surfaces of the cylinder 106 as the piston 102 reciprocates within the cylinder 106. The oil control ring groove 128 includes holes (not shown) so that the oil scraped from the cylinder 106 wall by the oil control ring 130 is distributed to an interior of the piston 102, and vice versa. Some of the holes may go from the oil control ring groove 128 to the boss bores to lubricate the wrist pin 114, connecting rod 116, interlocking piston buttons 104, 105, and associated connections. The piston 102 further includes piston ring grooves 134. The piston ring grooves 134 accommodate piston rings 133. The piston rings 133 provide a gas tight seal between the piston 102 and the interior walls of the cylinder 106, thus separating a combustion chamber (not shown) from a crankcase (not shown) with a minimum of oil blow-by.

Figure 2:
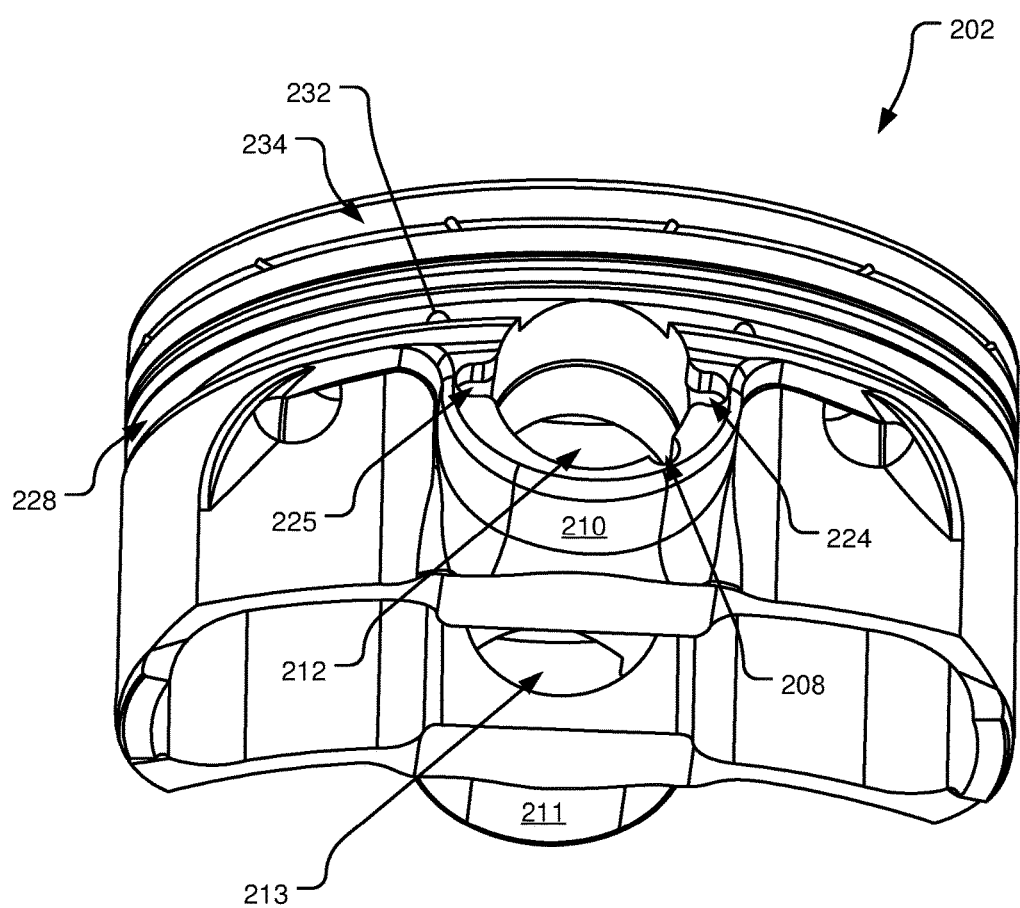
FIG. 2 is a perspective view of a piston for use in an engine piston assembly including interlocking boss bores.

FIG. 2 is a perspective view of a piston 202 for use in an engine piston assembly including interlocking boss bores 212, 213. More specifically, bosses 210, 211 include axially aligned interlocking boss bores 212, 213, respectively. The interlocking boss bore 212 includes two interlocking recess 224, 225. The interlocking boss bore 213 also includes two additional interlocking recess (not shown). The interlocking boss bores 212, 213 are circular apertures that that extend through the bosses 210, 211, respectively. The interlocking boss bores 212, 213 are further shown diametrically opposed across the piston 202 in FIG. 2. The interlocking recesses 224, 225 extend from a perimeter of the circular boss bore 212 and diametrically opposed across the boss bore 212. The additional interlocking recesses also extend from a perimeter of the circular boss bore 213. The piston 202 further includes an oil control ring groove 228 with associated holes (e.g., hole 232) and piston ring grooves 234.

The interlocking recesses 224, 225 may be located at any radial position about a perimeter of the boss bore 212, provided that the interlocking recesses 224, 225 do not intersect with the oil control ring groove 228. In the depicted implementation, interlocking recess 224 is located about 180 degrees from interlocking recess 225 on the perimeter of the interlocking boss bore 212. Additionally, the interlocking recesses 224, 225 extend from the boss bore 212 in directions substantially parallel to a top of the piston 202. In another implementation, only one interlocking recess 224 is located at a bottom of the interlocking boss bore 212 extending from the boss bore 212 in a direction substantially perpendicular to the top of the piston 202. In yet another implementation, additional interlocking recesses are located about the perimeter of the interlocking boss bore 212.

The interlocking recesses 224, 225 may also have a variety of profile sizes and shapes so long as they are of sufficient size to prevent rotation of a corresponding interlocking button (not shown). In the depicted implementation, the interlocking recesses 224, 225 in profile each have a straight portion joined to a semi-circular portion. The straight portion is defined by two substantially parallel straight lines, joined to a circumference of the interlocking boss bore 212 by a small outer radius. The interlocking recesses 224, 225 include radii, rather than sharp corners to reduce stress concentrations in the piston 202 (i.e., they have a rounded profile). In another implementation, the interlocking recesses 224, 225 have a straight portion joined by a curve with a larger or smaller curve radius than the depicted semi-circle. Further, the interlocking recesses of boss bore 213 may be the same or a different size and shape from the interlocking recesses 224, 225 of boss bore 212.

The interlocking recesses 224, 225 in profile may also be shaped with no straight portion. For example, in one implementation, the interlocking recesses 224, 225 may be shaped by a semi-circular curve that intersects with a perimeter of the interlocking boss bore 212. In another implementation, the interlocking recesses 224, 225 may be shaped by a curve with a larger or smaller curve radius than a semi-circle intersecting with the perimeter of the interlocking boss bore 212. Additionally, the interlocking recesses 224, 225 may have different shapes (e.g., triangular, square, etc.), with or without rounded corners. The interlocking recesses 224, 225 may have a variety of depths, as long as the face of a corresponding interlocking button (not shown) is substantially coincident with the piston 202 wall when the interlocking button is inserted into the interlocking boss bore 212.

Boss bore 213 also includes one or more interlocking recesses with various arrangements as described above with respect to interlocking recesses 224, 225 of boss bore 212. Further, the interlocking recesses of boss bore 213 may be the same or different from the interlocking recesses 224, 225 of boss bore 212. In various other implementations, the interlocking boss bores 212, 213 may each have any number of interlocking recesses so long as the interlocking recesses do not intersect with the oil control ring groove 228. The piston 202 may be made of a variety of materials, including but not limited to iron, steel, aluminum, and various alloys thereof. The piston 202 further includes passage 208, which may serve as an access port for removing the interlocking button from the boss bore 212. The passage 208 may also serve to access a clip (not shown) that selectively secures the interlocking button to a wrist pin (not shown, see wrist pin 114 of FIG. 1).

Figure 3:
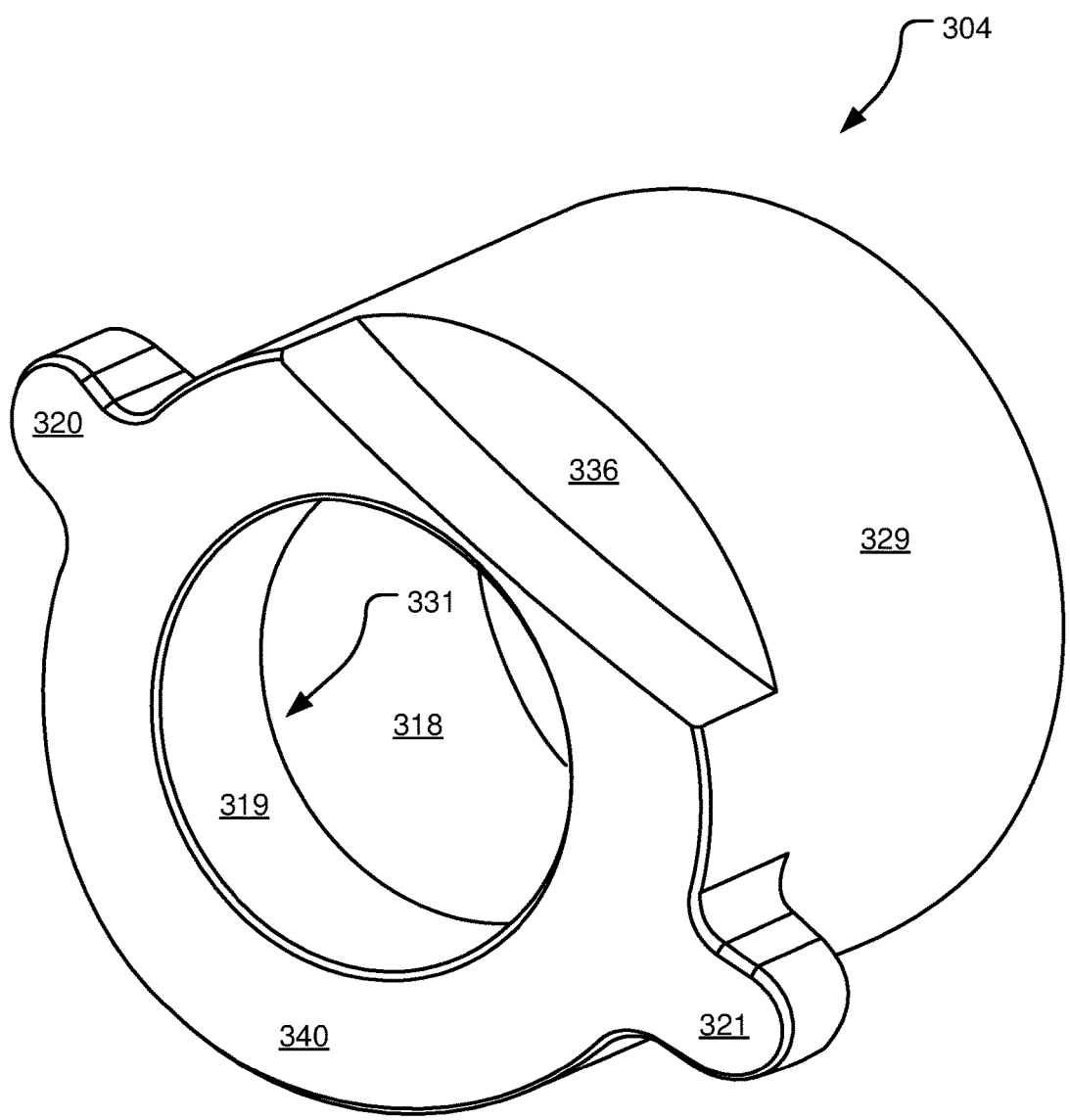
FIG. 3 is a perspective view of an interlocking piston button.

FIG. 3 is a perspective view of an interlocking piston button 304. The interlocking piston button 304 has a first inner diameter 318, a second inner diameter 319, and an outer diameter 329. In one implementation, the first inner diameter 318 of the interlocking piston button 304 is slightly larger than a diameter of a corresponding wrist pin (not shown) to allow for a slip-fit connection, which permits the wrist pin to rotate with respect to the interlocking piston button 304. In another implementation, the first inner diameter 318 of the interlocking piston button 304 is substantially the same as the diameter of the wrist pin to allow for a press-fit wrist pin, which prevents the wrist pin from rotating with respect to the interlocking piston button 304. The second inner diameter 319 of the interlocking piston button 304 is substantially smaller than the diameter of the wrist pin, so that the wrist pin is prevented from sliding through both ends of the interlocking piston button 304. A combination of the first inner diameter 318 and the second inner diameter 319 creates a seat 331 for the wrist pin within the interlocking piston button 304.

The outer diameter of the interlocking piston button 304 is slightly smaller than a diameter of a corresponding interlocking boss bore (not shown) so that the interlocking piston button 304 slip fits inside the interlocking boss bore. In other implementations, the outer diameter of the interlocking piston button 304 is substantially the same as the diameter of the corresponding interlocking boss bore so that the interlocking piston button 304 press fits inside the interlocking boss bore.

The interlocking piston button 304 includes interlocking protrusions 320, 321. The interlocking protrusions 320, 321 may be located at any radial position about a perimeter of the interlocking piston button 304. While two interlocking protrusions 320, 321 are shown in FIG. 3, any number of interlocking protrusions may be placed in any location about the perimeter of the interlocking piston button 304 provided that the interlocking protrusions do not intersect with an oil control ring groove (not shown). In one implementation, the interlocking protrusion 320 is located substantially 180 degrees from the interlocking protrusion 321 about a circumferential perimeter of the interlocking piston button 304. Further, both the interlocking protrusions 320, 321 are oriented substantially coincident with a face 340 of the piston button 304 (i.e., surface of the piston button 304 facing a cylinder wall when assembled).

The interlocking protrusions 320, 321 may also have a variety of profile sizes and shapes so long as they are of sufficient size to prevent rotation within a corresponding interlocking boss bore (not shown). In the depicted implementation, the interlocking protrusions 320, 321 in profile each have a straight portion joined to a semi-circular portion. The straight portion is defined by two substantially parallel straight lines, joined to a circumference of the interlocking piston button 304 by a small outer radius. The interlocking protrusions 320, 321 include radii, rather than sharp corners to reduce stress concentrations in the piston button 304 (i.e., they have a rounded profile). In another implementation, the interlocking protrusions 320, 321 have a straight portion joined by a curve with a larger or smaller curve radius than the depicted semi-circle.

The interlocking protrusions 320, 321 in profile may also be shaped with no straight portion. For example, in one implementation, the interlocking protrusions 320, 321 may be shaped by a semi-circular curve that intersects with a perimeter of the interlocking piston button 304. In another implementation, the interlocking protrusions 320, 321 may be shaped by a curve with a larger or smaller curve radius than a semi-circle intersecting with the perimeter of the interlocking piston button 304. Additionally, the interlocking protrusions 320, 321 may have different shapes (e.g., triangular, square, etc.), with or without rounded corners. The interlocking protrusions 320, 321 may have a variety of depths, as long as the face of the interlocking piston button 304 is substantially coplanar with a piston wall (not shown) when the interlocking piston button 304 is inserted into an interlocking boss bore.

Multiple interlocking piston buttons may include one or more interlocking recesses with various arrangements as described above with respect to interlocking protrusions 320, 321 of interlocking piston button 304. Further, the interlocking recesses of other interlocking piston buttons may be the same or different from the interlocking protrusions 320, 321 of interlocking piston button 304. In various other implementations, the interlocking piston buttons may each have any number of interlocking protrusions so long as the interlocking protrusions do not intersect with a corresponding oil control ring groove in a piston. The interlocking piston button 304 may be made of a variety of materials, including but not limited to iron, steel, aluminum, and various alloys thereof.

The interlocking piston button 304 includes an indentation 336 in the face 340 of the piston button 304. The piston button 304 is positioned to align with an oil control ring groove (not shown, see oil control groove 228 of FIG. 2) when installed in a piston. The indentation 336 accommodates an oil control ring by matching the surrounding oil control ring groove of the piston, as illustrated in FIG. 1. Size and location of the indentation 336 on the interlocking piston button 304 is defined by the size and location of the oil control ring groove on the piston. In one implementation, the indentation 336 extends from a top edge of the face 340 of the interlocking piston button 304. In another implementation, the indentation 336 may remove a portion of the face 340 of the interlocking piston button 304 within a middle portion of the interlocking piston button 304, forming a channel (not shown). A width of the channel would substantially match a width of the oil control ring groove. A depth of the indentation 336 is also defined by the oil control ring groove. In various implementations, the depth of the indentation 336 is the same as the depth of the oil control ring groove, so that the indentation is coincident with the oil control ring when the interlocking piston button is inserted into the piston.

Figure 4:
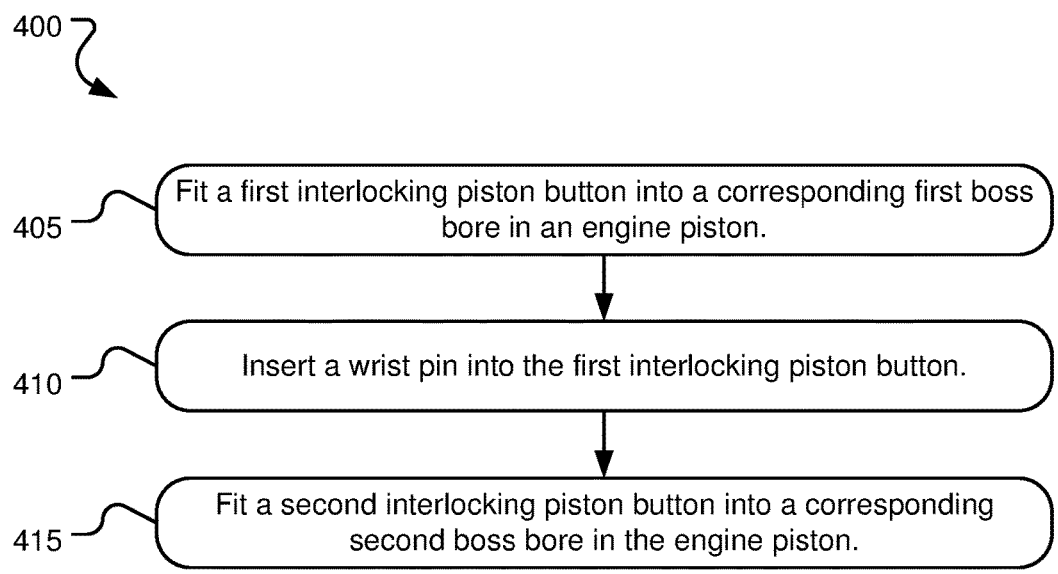
FIG. 4 shows example operations for assembling an engine piston including interlocking piston buttons.

FIG. 4 shows example operations 400 for assembling an engine piston including interlocking piston buttons. A first fitting operation 405 fits a first interlocking piston button into a corresponding first boss bore in the engine piston. The first piston button includes one or more interlocking protrusions that correspond to one or more interlocking recesses in the first boss bore. When the first piston button is inserted into the first boss bore, the interlocking protrusion(s) fit into the interlocking recess(es), which prevents the first piston button from rotating within the first boss bore. Further, the first piston button may include an indentation that aligns with an oil control ring groove when fit within the piston. The indentation may permit an oil control ring to extend across the first piston button without interruption. Still further, since the first piston button is prevented from rotating within the first boss bore, potential deformation of the oil control ring is also prevented.

A first inserting operation 410 inserts a wrist pin into the first interlocking piston button. More specifically, the wrist pin is inserted through a second boss bore, and inserted into a seat within the first interlocking piston button in the first boss bore. In some implementations, before the wrist pin is inserted into the first interlocking piston button, it will also be inserted through a connecting rod.

A second fitting operation 415 fits the second interlocking piston button into the second corresponding boss bore in the engine piston. The second piston button includes one or more interlocking protrusions that correspond to one or more interlocking recesses in the second boss bore. When the second piston button is inserted into the second boss bore, the interlocking protrusion(s) fit into the interlocking recess(es), which prevents the second piston button from rotating within the second boss bore. Further, the second piston button may include an indentation that also aligns with the oil control ring groove when fit within the piston. The indentation may permit the oil control ring to extend across the second piston button as well without interruption. Still further, since the second piston button is prevented from rotating within the second boss bore, potential deformation of the oil control ring is also prevented. As the second piston button is fit into the second boss bore, the wrist pin is inserted into a seat on the second piston button. As a result, the opposing first and second piston buttons hold the wrist pin in place within the engine piston.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An engine piston assembly comprising:
a piston including an oil control ring groove, a first boss bore, and a second boss bore, the first boss bore including a first interlocking recess and the second boss bore including a second interlocking recess, wherein the second boss bore opposes the first boss bore;
a first piston button including a first interlocking protrusion that fits within the first interlocking recess of the first boss bore and a first indentation that aligns with the oil control ring groove when fit within the piston; and
a second piston button including a second interlocking protrusion that fits within the second interlocking recess of the second boss bore and a second indentation that aligns with the oil control ring groove when fit within the piston.

2. The engine piston assembly of claim 1, wherein the first piston button is slip-fit within the first interlocking recess and the second piston button is slip-fit within the second interlocking recess.

3. The engine piston assembly of claim 1, wherein the first boss bore includes a third interlocking recess, the first piston button includes a third interlocking protrusion, and the third interlocking protrusion fits within the third interlocking recess of the first boss bore.

4. The engine piston assembly of claim 3, wherein the second boss bore includes a fourth interlocking recess, the second piston button includes a fourth interlocking protrusion, and the fourth interlocking protrusion fits within the fourth interlocking recess of the second boss bore.

5. The engine piston assembly of claim 1, wherein one or both of the first piston button and the second piston button include a first inner diameter and a second smaller inner diameter forming a seat.

6. The engine piston assembly of claim 5, further comprising:
a wrist pin slip-fit between the first piston button and the second piston button and resting in the seat.

7. The engine piston assembly of claim 1, wherein a depth of the first interlocking recess is substantially the same as the depth of the first interlocking protrusion and a depth of the second interlocking recess is substantially the same as the depth of the second interlocking protrusion.

8. The engine piston assembly of claim 1, wherein one or both of the first and second interlocking protrusions have a rounded profile.

9. A piston comprising:
a first boss with a bore including two diametrically opposed interlocking recesses;
a second boss with a bore including two additional diametrically opposed interlocking recesses, wherein the second boss bore is axially aligned with the first boss bore; and
an oil control ring groove, the oil control ring groove intersecting the first boss bore and the second boss bore.

10. The piston of claim 9, further comprising:
a first piston button including two diametrically opposed interlocking protrusions that fit within the two diametrically opposed interlocking recesses of the first boss bore; and
a second piston button including two additional diametrically opposed interlocking protrusions that fit within the two diametrically opposed interlocking recesses of the second boss bore.

11. The piston of claim 10, wherein one or both of the first piston button and the second piston button includes an indentation that aligns with the oil control ring groove when fit within the piston.

12. The piston of claim 10, wherein one or both of the first piston button and the second piston button include a first inner diameter and a second smaller inner diameter forming a seat.

13. The piston of claim 12, further comprising:
a wrist pin slip-fit between the first piston button and the second piston button and resting in the seat.

14. The piston of claim 9, wherein one or more of the interlocking recesses have a rounded profile.

15. A method of assembling an engine piston comprising:
fitting a first piston button including a first interlocking protrusion into a first boss bore including a first interlocking recess such that a first indentation in the first piston button aligns with an oil control ring groove in the engine piston;
inserting a wrist pin through a second boss bore and into a seat of the first piston button within the first boss bore; and
fitting a second piston button including a second interlocking protrusion into the second boss bore including a second interlocking recess such that a second indentation in the second piston button aligns with the oil control ring groove, while inserting the wrist pin into a seat of the second piston button.

16. The method of claim 15, wherein fitting the first piston button into the first boss bore includes fitting the first interlocking protrusion into the first interlocking recess, and wherein fitting the second piston button into the second boss bore includes fitting the second interlocking protrusion into the second interlocking recess.

17. The method of claim 15, wherein the first boss bore includes a third interlocking recess, the first piston button includes a third interlocking protrusion, and wherein fitting the first piston button into the first boss bore includes fitting the third interlocking protrusion into the third interlocking recess.

18. The method of claim 15, wherein the second boss bore includes a fourth interlocking recess, the second piston button includes a fourth interlocking protrusion, and wherein fitting the second piston button into second first boss bore includes fitting the fourth interlocking protrusion into the fourth interlocking recess.

19. The method of claim 15, wherein one or both of the first and second interlocking protrusions have a rounded profile.

* * * * *